UNITED STATES PATENT OFFICE.

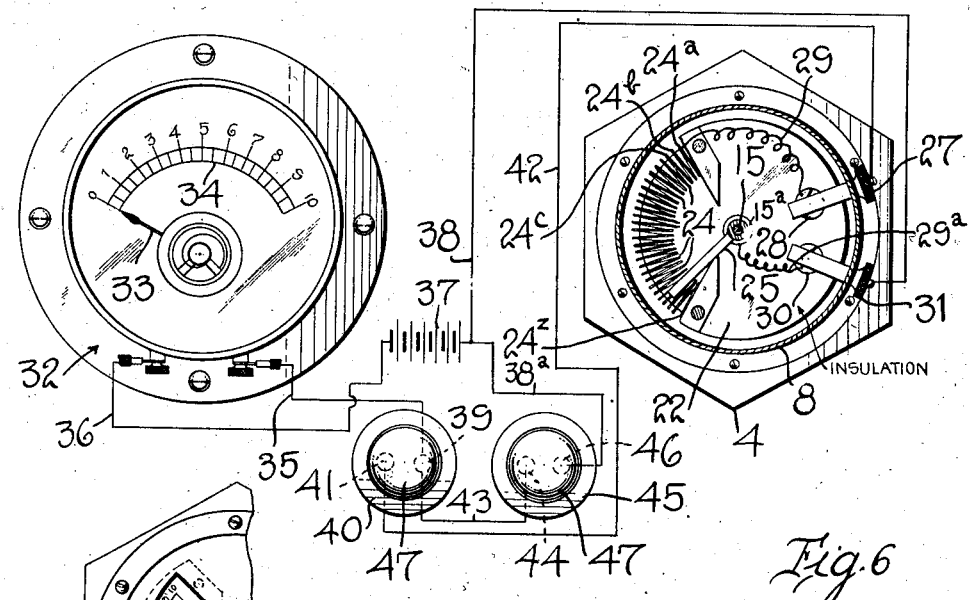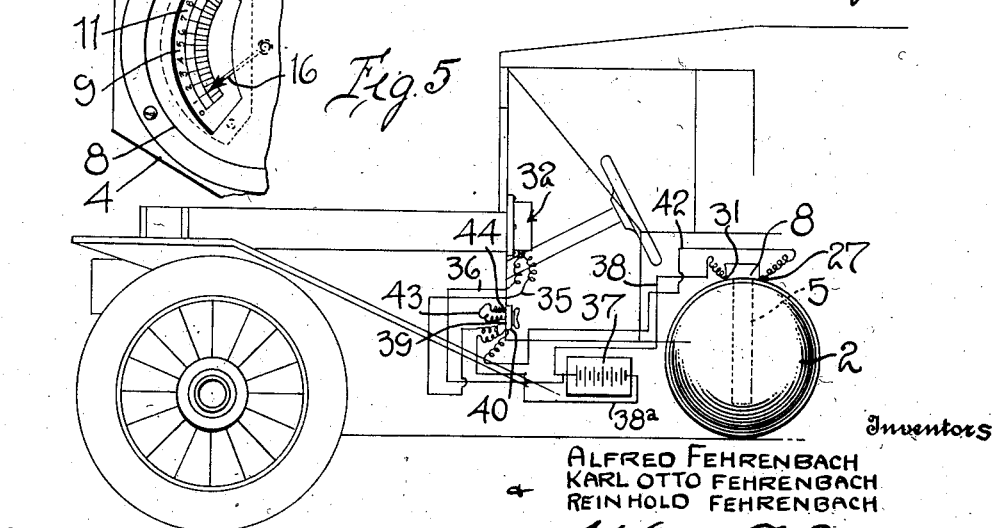

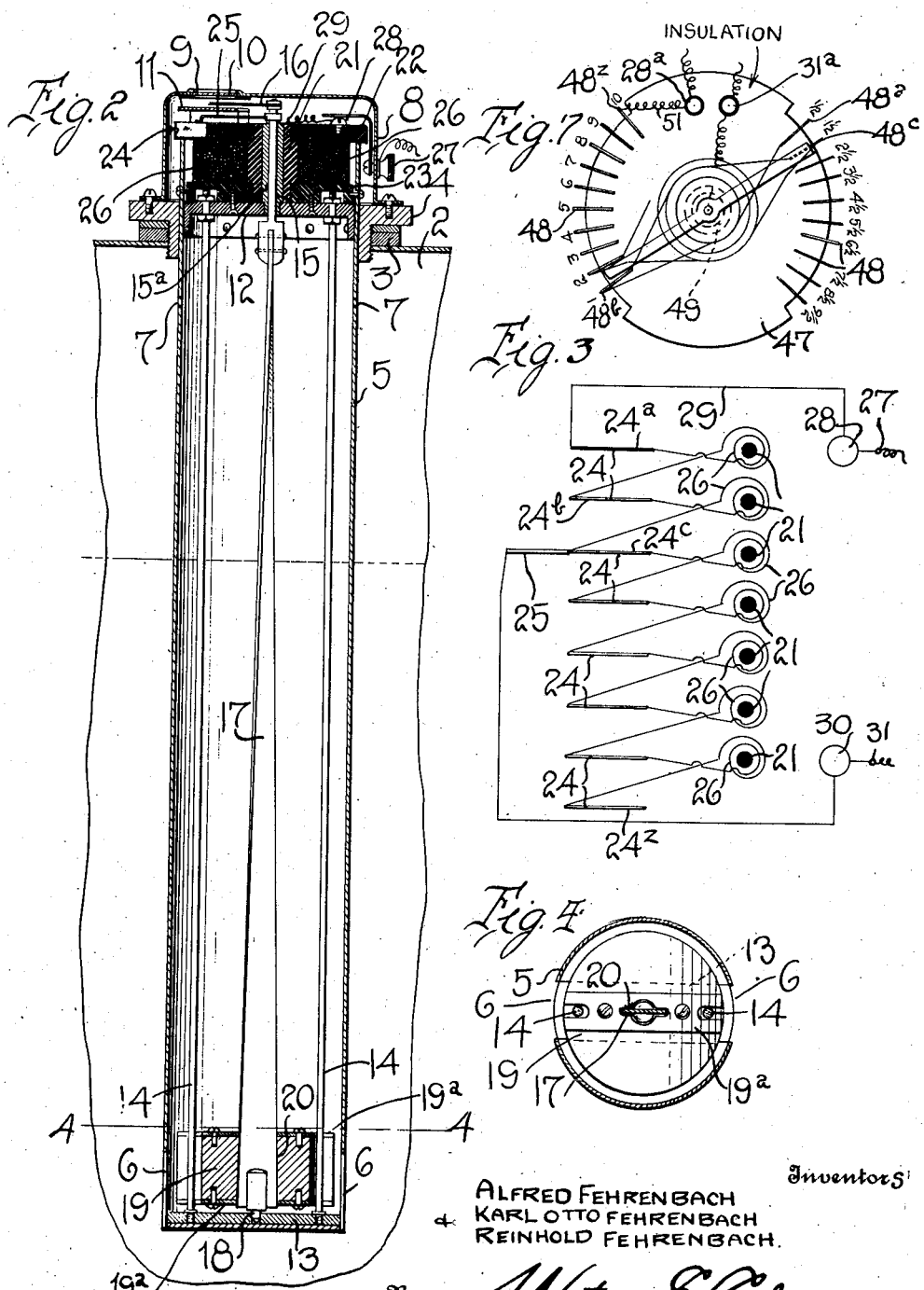

ALFRED FEHRENBACH, KARL OTTO FEHRENBACH, AND REINHOLD FEHRENBACH, OF WOODBURY, NEW JERSEY.

ELECTRIC METER AND FLUID-GAGE.

1,175,417.  Specification of Letters Patent.  Patented Mar. 14, 1916.

Application filed May 15, 1915. Serial No. 28,415.

*To all whom it may concern:*

Be it known that we, ALFRED FEHRENBACH, KARL OTTO FEHRENBACH, and REINHOLD FEHRENBACH, citizens of the United States, residing at Woodbury, in the county of Gloucester and State of New Jersey, have invented certain new and useful Improvements in Electric Meters and Fluid-Gages, of which the following is a specification, reference being had to the accompanying drawings.

Our invention relates to gages, and particularly to gages used in connection with automobiles.

The principal object of our invention is to provide, in connection with a voltmeter or ammeter, means whereby the meter may be used not only for the purpose of indicating the voltage or amperage of electric current, but also may be used for indicating the height of liquid in a tank.

A further object of our invention is the provision of electrical means for indicating the height of a liquid in a tank, this means being adapted to be disposed at any desired distance from the tank.

Another object of our invention is the provision of a mechanism for the purpose heretofore described, and including circuit controlling buttons so arranged that when one button is pressed the mechanism will indicate the voltage or amperage of the battery or generator current, and when the other button is pressed the mechanism will indicate the height of the liquid in a container.

A further object of the invention is to provide separate means for indicating the height of the current in a gasolene container, these separate indicating means being adapted to be located at different points, as for instance, one being located in the rear of the automobile where the tank is located, and the other indicator being located on the dash board of the automobile.

Other objects will appear in the course of the following description.

Our invention is illustrated in the accompanying drawings, wherein:

Figure 1 is a plan view of our invention, partly diagrammatic and showing the float chamber in section to show the rheostat; Fig. 2 is a longitudinal sectional view of the float chamber and rheostat; Fig. 3 is a diagrammatic view of the rheostat and its windings; Fig. 4 is a section on the line 4—4 of Fig. 2; Fig. 5 is a fragmentary top plan view showing the housing of the rheostat and the dial 11; Fig. 6 is a side elevation of the portion of an automobile showing my invention as applied thereto; Fig. 7 is a top plan view of another form of rheostat for use with our device.

Referring to the drawings, 2 designates a tank for containing gasolene, but which tank may be for containing any other liquid. This tank is supposed to be the ordinary gasolene tank mounted on the rear of an automobile. The top of the tank has an opening in which is disposed a bushing 3 having screw threaded engagement with a ring or collar 4 to which is connected, as by soldering, the depending tube or cylinder 5. This tube at its lower end is provided with an opening 6 to permit the entrance of liquid into the interior of the tube and is provided at its upper end with air openings 7. It is of course obvious that the liquid in the container 2 will stand at the same height within the casing tube 5 as it does exteriorly to the casing 5.

The collar or ring 4 is hexagonal in shape to permit the application of a wrench thereto, and mounted upon this collar and extending up therefrom is a cylindrical housing 8 which is formed with an opening 9 beneath which is placed a glass pane 10. This opening is preferably segmental in form and is for the purpose of reading the figures on a dial 11 disposed below the opening.

The tubular casing 5, as illustrated in Fig. 2, extends above the collar 4, and disposed within this tubular casing is a disk or plate 12, of metal or other suitable material, and disposed in the bottom of the tube 5 is a base plate 13. These plates are connected by vertically extending rods 14 which have screw threaded engagement at their lower ends with the plate 13 and at their upper ends pass through the plate 12 and are connected thereto by means of nuts. Passing through a central opening in the plate 12 is a rotatable shaft 15 which carries a pointer 16 coacting with the dial 11, and the lower end of this shaft 15 is enlarged to form a head which will receive the upper end of a strip of metal 17. The lower end of this strip of metal is provided with a downwardly extending stud 18 which is rotatably supported in a bearing formed in the plate 13. This strip 17 is twisted so that the ends are disposed in planes at right angles to each other, and coacting with this strip 17 is a float 19 which is preferably of cork or other suitable material, but may be made hollow and of sheet metal, guided by means of metal strips 19$^a$ slotted at their ends to loosely engage the rods 14.

The guide rods 14 pass through the strips 19$^a$ and prevent any rotation of the float. The middle of the float is formed with a slot 20 in which the strip 17 snugly fits, the slot having a width, however, sufficient to permit the free upward movement of the float along the strip. It will now be seen that upon a downward movement of the float, due to a fall of the liquid level in the tank 2, the float will act to rotate the strip 17 and thus rotate the shaft 15 and pointer 16. The amount of this rotation, and as a consequence the level of the float, is indicated upon the dial 11.

For the purpose of causing the position of the float to be indicated upon the dial of a voltmeter or ammeter, we provide, in connection with the shaft 15, a rheostat connected in circuit with a battery and the voltmeter before referred to, and provide an arm mounted upon the shaft 15 which travels over the contacts of the rheostat and cuts out or cuts in resistance in accordance with the direction in which the shaft 15 is rotated by the movement of the float. The cutting in or cutting out of resistance will of course affect the current passing through the voltmeter and thereby cause the pointer of the voltmeter to move in accordance with the change in current.

The details of this apparatus are as follows: Surrounding the shaft 15 is a core 21 of insulating material which is shouldered adjacent the upper and lower ends for engagement with upper and lower plates 22 and 23 of insulating material such as hard fiber or like material. The plate 22 along one portion of its circumference is radially slitted at a plurality of points, and inserted in these radial slits are a plurality of copper strips 24. These strips coact with a rheostat arm 25 mounted upon the shaft 15, this arm passing over the strips and adapted to contact therewith. Surrounding the core 21 is a coil of fine wire, designated 26, this wire being connected to the strips 24 in a manner which will be later described.

Mounted upon the wall of the housing 8 and insulated therefrom is a binding post 27 which has a contact which extends upward over the plate 22 and engages with a screw 28 which in turn engages with a wire 29. This wire extends over to the first contact 24$^a$ of the series of contacts 24. From this contact 24$^a$ the wire 29 extends to the core 21 and is wound thereon a predetermined number of times. The wire then returns to the contact 24$^b$ and then extends back to the core and is wound thereon again a predetermined number of times and extends to the contact 24$^c$, and so on until the wire reaches the contact 24$^z$, which is the last contact of the series. From a metallic sleeve 15$^a$ which surrounds the shaft 15, a conductor 29$^a$ extends to a binding screw 30 which in turn is electrically engaged with a binding post 31. It will of course be understood that the coil of wire 26 and the wire 29 is thoroughly insulated, as by a wax filling disposed within the cylinder 5 and surrounding the coil 26.

Mounted upon the dash board of the machine, or in any other suitable position desired, or mounted at any distance from the container 2, is an electrical measuring device which may be either an ammeter or a voltmeter but which is assumed to be in this instance a voltmeter and which is designated generally 32. This voltmeter may be of any suitable construction and of an ordinary type, and therefore needs no particular description. The voltmeter includes the pointer 33 and the dial 34 over which the pointer moves, and the two wires 35 and 36 operatively connected in the usual manner to the voltmeter. The wire 36 passes from the voltmeter to one pole of the battery 37, and the opposite pole of the battery is connected by means of a wire 38 to the binding post 31. The other wire 35 from the voltmeter extends to one terminal 39 of a switch 40. The other terminal 41 of this switch is electrically connected by means of the wire 42 to the binding post 27.

From the terminal 39 of the switch 40 extends a wire 43 to one terminal 44 of a switch 45, the other terminal 46 of which is connected by wire 38$^a$ to the battery through the wire 38. It will thus be seen that when the terminals 44 and 46 of the push button 45 are connected, a circuit will be made from the battery through the wire 38$^a$ to the terminal 46, then through the terminal 44 to the wire 43, thence to terminal 39 and through wire 35 to the voltmeter, and back through the wire 36 to the battery, thus completing a circuit through the battery and voltmeter alone. At this time the voltmeter will register the electromotive force of the battery, or, if the meter is an ammeter, it will register the amperage of the current. If, however, the switch 40 be closed, a circuit will be completed from the battery through wire 38, through the binding post 31, through the rheostat to the binding post 27, thence back by wire 42 to terminal 41, thence to terminal 39, thence from terminal 39 through wire 35 to the voltmeter, through the voltmeter back by wire 36, thence to the opposite pole of the battery thus completing a circuit which includes the battery and rheostat.

Inasmuch as the resistance of the rheostat will be varied by the rise or fall of the float, it is obvious that the voltmeter will indicate by the position of the pointer 33 the height of the float and the consequent height of the liquid within the container. It will also be obvious that the height of the float will be indicated by means of the pointer 16 operating over the dial 11, and thus the height of the liquid in the container may be read either upon the dial of the voltmeter or upon the dial 11. As the float rises, the resistance will be cut out and thus the pointer 33 will move farther and farther over the dial 34, while, as the float falls, the resistance will be cut in, thus reversely affecting the movement of the pointer 33. When in normal circumstances and when neither of the switches 40 or 45 are operated, the voltmeter will not be effected. If it is desired to determine the amount of liquid in the tank 2, the switch 40 is actuated and the pointer 33 will indicate the amount of liquid in the tank by its position upon the dial 34. If, however, it is desired to determine the voltage of the battery 37 the switch 45 is actuated.

We do not wish, of course, to be limited to the character of the switches used, but have indicated a switch wherein the terminals 41 and 39, for instance, in switch 40 are bridged or electrically connected by means of a button 47, which, when pressed inward, connects the terminals, and which, when forced outward, as by means of a spring, breaks the circuit across the terminals. The hand or pointer 25 of the rheostat is preferably as wide as the space between any two of the metal contacts 24 so that as soon as the hand moves off of one contact it will touch or electrically engage the other.

The gage scale 11, as illustrated, is to indicate the level of gasolene in a ten gallon tank, and is shown as registering half gallons and gallons. It will be obvious that it might be made to register one quarter of a gallon and less. In Fig. 7 we show a slightly modified form of rheostat operating on the same principle as the rheostat shown in Figs. 1 and 2 but adapted to indicate fractions of a gallon. The construction of this rheostat is precisely the same as that shown in Figs. 1 and 2, except that it has a double rheostat arm and a double set of rheostat contacts. In this figure, 47 designates a plate of insulating material, equivalent to the plate 22 in Fig. 2. This plate is notched at opposite sides for the metal contact strips 48 which are equivalent to the contact strips 24. The core is formed of insulating material, as previously described, and is shown in dotted lines and designated 49.

There is a binding screw 28$^a$ corresponding to the binding post 27 and screw 28, and a binding post 31$^a$ corresponding to the binding post 31. From the binding post 31$^a$ extends a wire to the sleeve surrounding the spindle on which the rheostat arm 50 is mounted. From the binding screw 28$^a$ extends a wire 51 corresponding to the wire 29. From the contact 48$^a$, which is illustrated in Fig. 7 as being on the right hand side of the rheostat, the wire 51 extends to the core 49 and is wrapped therearound a number of times. It then extends to the contact 48$^b$ on the opposite side, and then again extends back to the core 49 and is wrapped therearound a number of times and again goes to the contact 48$^c$ on the opposite side, and so on until it reaches the contact 48$^z$ from which the wire extends to the binding screw 28$^a$. It will be noted from Fig. 7 that the contacts 48 on one side are disposed in staggered relation to the contacts on the other side of the rheostat. The contacts on the left hand side are supposed to be spaced apart a distance corresponding to gallon measurements, while the contacts on the opposite side are supposed to be spaced apart a distance equal to gallon measurements, but inasmuch as they are in staggered relation to the contacts on the left hand side they will indicate half gallons. The rheostat arm 50 extends across so that the ends of the arm will sweep over both sets of contacts.

It will be noted that on the rising of the float the rheostat arm will be turned, will come in contact first with 48$^a$ indicating a half gallon, then as the float continues to rise the rheostat arm will move farther until the left hand end of the arm will come in engagement with the contact 24$^b$, indicating one gallon, while the right hand end of the arm will have moved off of the contact 48$^a$ and not yet reach the contact 48$^c$. As soon as one end of the rheostat arm moves off of a contact on that side it will engage a contact on the opposite side. The pointer (not shown) which corresponds to the pointer 16 in Figs. 1 and 2, indicates the gallons and half gallons by means of a scale such as that shown in Fig. 5. It will also be seen that the blank spaces between the two sets of rheostat contacts might also be divided up if necessary. This rheostat, as illustrated in Fig. 7, is used where the slots for holding the rheostat contacts are very close together and where it is desirable to indicate fractions of a gallon.

While we have illustrated the device as if the tank and its indicating mechanism and the voltmeter were relatively close together, it will be obvious that the voltmeter might be located a considerable distance away from the tank and still perform its function of indicating the height of the liquid in the tank. Also while we have illustrated the voltmeter as being so connected as to indicate voltage or amperage, it will be obvious that where the device is to be used for merely indicating the level of liquid in a tank the switch 40 need not be used, but the voltmeter will be connected up through the battery with the rheostat at all times, the circuit, however, being broken by the switch 40.

While we have illustrated certain details of construction which we believe to be most effective, we wish it understood that these details might be varied without departing from the spirit of the invention.

Having thus described the invention, what is claimed, is:

1. The combination with a liquid container, of a float supporting structure depending thereinto, a float supported by the structure, a rheostat mounted upon the upper end of the float structure and comprising a plurality of insulated fixed contacts, a core, coils formed upon said core and electrically connecting the several contacts in series with each other, a shaft passing through the core and carrying a contact arm shiftable to engage with one of the first-named contacts, said float being operatively connected to said shaft to cause its rotation in one or the other direction upon a rise or fall of the float, and an electrical measuring device connected in circuit with the fixed contacts and the movable contact arm of the rheostat and with a source of current.

2. The combination with a container holding liquid, of a shaft passing through the wall of the container, a float disposed in the container moving parallel to the axis of said shaft, operative connections between the float and the shaft whereby the shaft may be rotated in one or the other direction upon a rise or fall of the float, a pointer mounted upon the shaft, a dial over which the pointer moves, a rheostat mounted concentrically to the shaft and including a plurality of resistance units, a contact arm mounted upon the shaft and forming part of the rheostat and movable over said units, an electrical measuring device electrically connected in circuit with a source of current and with the resistance units of the rheostat and the movable contact arm.

3. The combination with a container holding liquid, of a shaft, a float disposed in the container and adapted to rotate said shaft, a pointer mounted on said shaft, a dial over which the pointer moves, a plate of insulating material concentric to the shaft, two sets of radiating spaced contacts mounted upon said plate and disposed at opposite sides of the plate, the contacts of one set being in staggered relation to the contacts of the other set, a contact arm mounted upon the shaft and extending in opposite directions therefrom, and electrically engaging the two sets of contacts, a conductor connected to the first one of the contacts of one set, then coiled and connected to the last one of the contacts of the opposite set and thus successively connected to the next succeeding contact of one set and the next succeeding contact of the opposite set, and an electrical measuring device connected in circuit with a source of current and through said wire with said series of fixed contacts and also connected in circuit with the movable contact arm.

4. The combination with a liquid container and an electrical measuring device connected to a source of current, of a closure for the container including a base, a shaft passing through the base, a float, means operatively connecting the shaft to the float to cause the rotation of the shaft in one or the other direction upon the rise or fall of the float, an insulated core surrounding the shaft, disks of insulating material disposed upon said core in spaced relation to each other, a rheostat arm mounted upon the shaft, a plurality of metallic strips radially disposed and arranged in a series concentric to the shaft and inserted in one of said disks of insulating material, said strips forming contacts and being electrically connected to each other by windings, said series of contact strips and the rheostat arm being connected in open circuit with the source of current and the measuring device, and means for closing said circuit.

5. The combination with a tank containing liquid and having an opening, of a cap having engagement with the wall of the opening, a float chamber mounted upon the cap and adapted to depend into the container through said opening, a cover mounted upon the cap and extending across the same, and forming a casing, said casing having a sight opening, a shaft operatively supported upon the cap, a deflected blade connected at its upper end to said shaft and supported in a bearing at the lower end of the float chamber, a float mounted upon the blade and causing its rotation, a rheostat disposed upon said cap and including a plurality of contact members arranged concentrically to the shaft and connected to each other by windings, a contact arm mounted upon the shaft and coacting with said first named contacts, a dial supported above the contact arm, a pointer mounted upon the shaft and coacting with the dial, an electrical measuring device connected in an open circuit with the battery and with the contacts of the rheostat and the rheostat arm, and means for closing said open circuit.

6. The combination with a container holding liquid, of a shaft, a float disposed in the container and adapted to rotate said shaft, a plate of insulating material concentric to the shaft, a plurality of sets of radiating spaced contacts mounted on said plate, a plurality of contact arms mounted upon the shaft and extending in different radial directions therefrom and each electrically engaging with one of said sets of contacts, a conductor connected to the first one of the contacts of one set, then coiled and connected to the last one of the contacts of another set and successively connected to the next succeeding contact of one set and the next succeeding contact of another set, and an electrical measuring device connected in circuit with a source of current and through said wire with said series of fixed contacts and also connected in circuit with the movable contact arms.

7. A float controlled indicating device including a cap, a cylinder extending downward from the cap and having openings at its lower end, guide members extending downward through the cylinder and operatively engaged with the cap, a spirally deflected blade supported at its lower end for rotation, a member disposed in the upper end of the cylinder and attached thereto with which the upper ends of the guide members engage, a shaft passing through said member and connected to the upper end of the deflected blade, a float engaging the blade and the guide members, a rheostat mounted upon said member concentric to the shaft and insulated therefrom including a plurality of spaced contacts disposed at intervals concentric to the shaft, and a contact arm mounted on the shaft and coacting with the rheostat contacts.

8. A float controlled indicating device including an annulus, a cylinder depending from the annulus and supported thereby and having openings at its lower end, a supporting member extending across the cylinder adjacent its upper end, guide rods attached to said supporting member at their upper ends and operatively connected to the bottom of the cylinder at their lower ends, a shaft passing through said supporting member, a deflected blade connected to the shaft at its upper end and rotatably mounted at its lower end, a float movable upon said blade and operatively engaging said guide rods, a rheostat mounted upon said supporting member concentric to the shaft and including a plurality of contacts concentric to the shaft, a contact arm mounted upon the shaft and engaging said rheostat contacts, the rheostat contacts and the contact arm being adapted to be connected in circuit with a source of energy, a pointer mounted upon the shaft above the rheostat arm, a dial with which the pointer coacts, and a cap having a side opening detachably mounted upon said annular member and extending over the rheostat, dial and pointer.

In testimony whereof we hereunto affix our signatures in the presence of two witnesses.

ALFRED FEHRENBACH.
KARL OTTO FEHRENBACH.
REINHOLD FEHRENBACH.

Witnesses:
FRANK D. PEDRICK,
FRANCIS B. DAVIS.